(12) United States Patent
Ikeda et al.

(10) Patent No.: US 8,388,382 B2
(45) Date of Patent: Mar. 5, 2013

(54) POWER UNIT AND BATTERY CONNECTOR

(75) Inventors: Tomohiro Ikeda, Makinohara (JP);
Keizo Aoki, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/258,232

(22) PCT Filed: Aug. 17, 2010

(86) PCT No.: PCT/JP2010/063842
§ 371 (c)(1),
(2), (4) Date: Sep. 21, 2011

(87) PCT Pub. No.: WO2011/021614
PCT Pub. Date: Feb. 24, 2011

(65) Prior Publication Data
US 2012/0015550 A1 Jan. 19, 2012

(30) Foreign Application Priority Data
Aug. 18, 2009 (JP) .................................. 2009-188893

(51) Int. Cl.
*H01R 13/405* (2006.01)
(52) U.S. Cl. ........................ 439/627; 439/500; 439/397
(58) Field of Classification Search .................. 439/627, 439/500, 397–400
See application file for complete search history.

(56) References Cited

U.S. PATENT DOCUMENTS

| 6,146,788 A | 11/2000 | Ikeda et al. |
| 6,275,003 B1 | 8/2001 | Marukawa et al. |
| 6,290,552 B1 | 9/2001 | Saito et al. |
| 2008/0050981 A1* | 2/2008 | Pavlovic et al. .............. 439/701 |

FOREIGN PATENT DOCUMENTS

| JP | 11-120988 A | 4/1999 |
| JP | 2000-333343 A | 11/2000 |
| JP | 2001-057196 A | 2/2001 |
| JP | 2001-110395 A | 4/2001 |
| JP | 2006-269104 A | 10/2006 |

OTHER PUBLICATIONS

International Search Report of PCT/JP2010/063842 filed Nov. 22, 2010.

* cited by examiner

*Primary Examiner* — Gary F. Paumen
(74) *Attorney, Agent, or Firm* — Sughrue Mion, PLLC (57) ABSTRACT

A bus bar 3 connects in series the plurality of batteries 10 by connecting a positive electrode 12 with a negative electrode 13 in each of the adjacent batteries. A terminal 4 is connected to the bus bar, and to which an electric wire is attached. The bus bar 3 and the terminal 4 are integrally formed with each other with a coupling portion 9. Further, the terminal 4 includes at least a pair of press-connecting blades 42d for cutting through an insulating cover of an electric wire 5 and press-contacting a core wire of the electric wire 5 when the electric wire 5 is press-fitted into between the press-connecting blades 42d.

5 Claims, 7 Drawing Sheets

POWER UNIT AND BATTERY CONNECTOR

CROSS REFERENCE TO RELATED APPLICATIONS

This application is a National Stage of International Application No. PCT/JP2010/063842 filed Aug. 17, 2010, claiming priority based on Japanese Patent Application No. 2009-188893 filed Aug. 18, 2009, the contents of all of which are incorporated herein by reference in their entirety.

TECHNICAL FIELD

This invention relates to a power unit and a battery connector, in particular, to the power unit mounted on a hybrid vehicle or an electric vehicle, and to the battery connector used in the above power unit.

BACKGROUND ART

Figure 1:
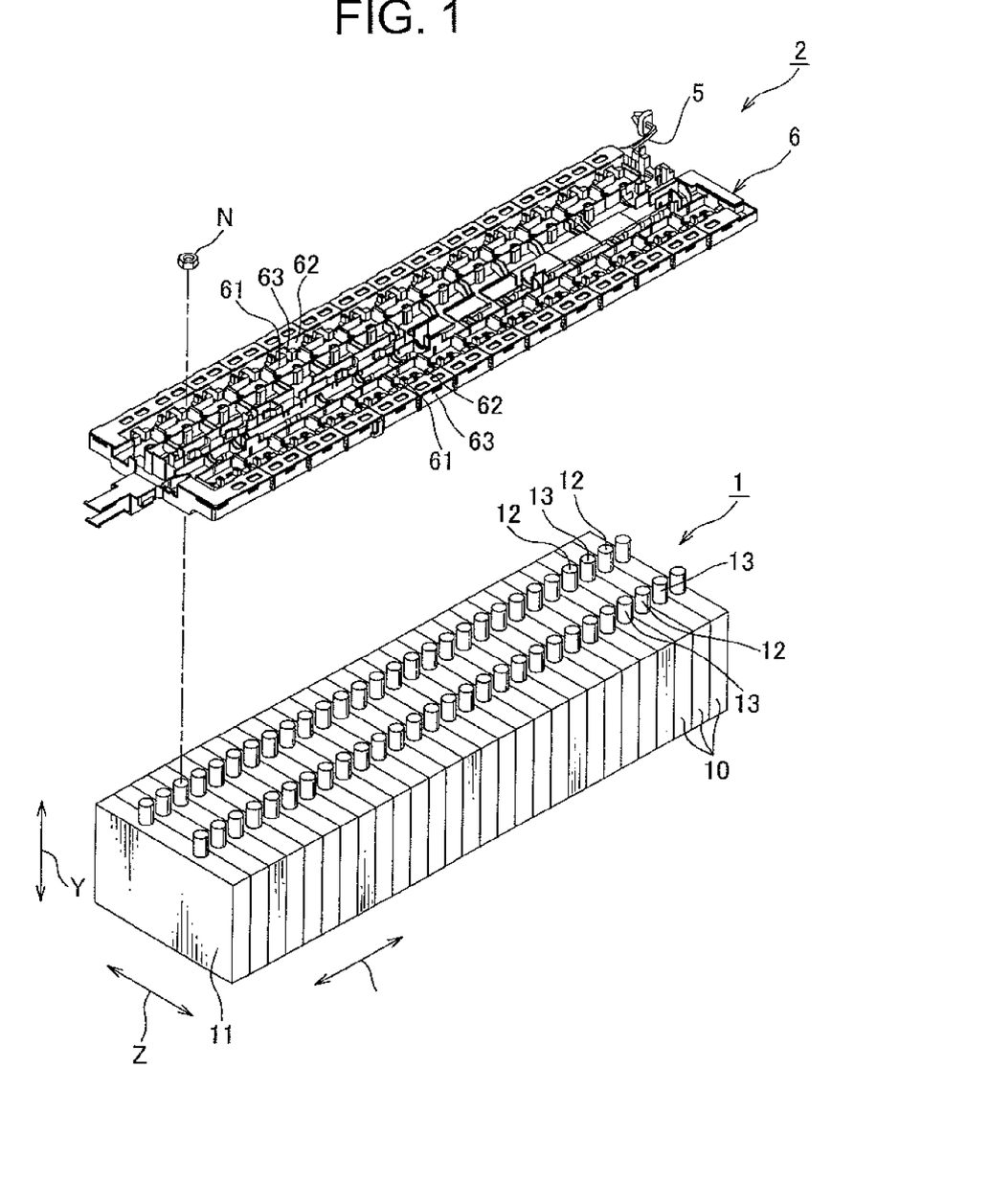
FIG. 1 An exploded perspective view showing an embodiment of a power unit according to the present invention.

For example, the above-described power unit as a driving source for an electric motor is mounted on an electric vehicle running by the electric motor or the like, a hybrid vehicle running with a combination of an engine and the electric motor, or the like. The power unit is composed of a battery assembly 1 (FIG. 1) and a battery connector 2 (FIG. 7) attached to the battery assembly 1. As shown in FIG. 1, the battery assembly 1 is composed of a plurality of batteries 10 arranged side-by-side relationship. A positive electrode 12 and a negative electrode 13 projected from a box-shaped chassis are provided with each battery 10. The positive electrodes 12 and the negative electrodes 13 are overlapped with each other in a manner that they are alternately arranged in the plurality of batteries 10.

Figure 7:
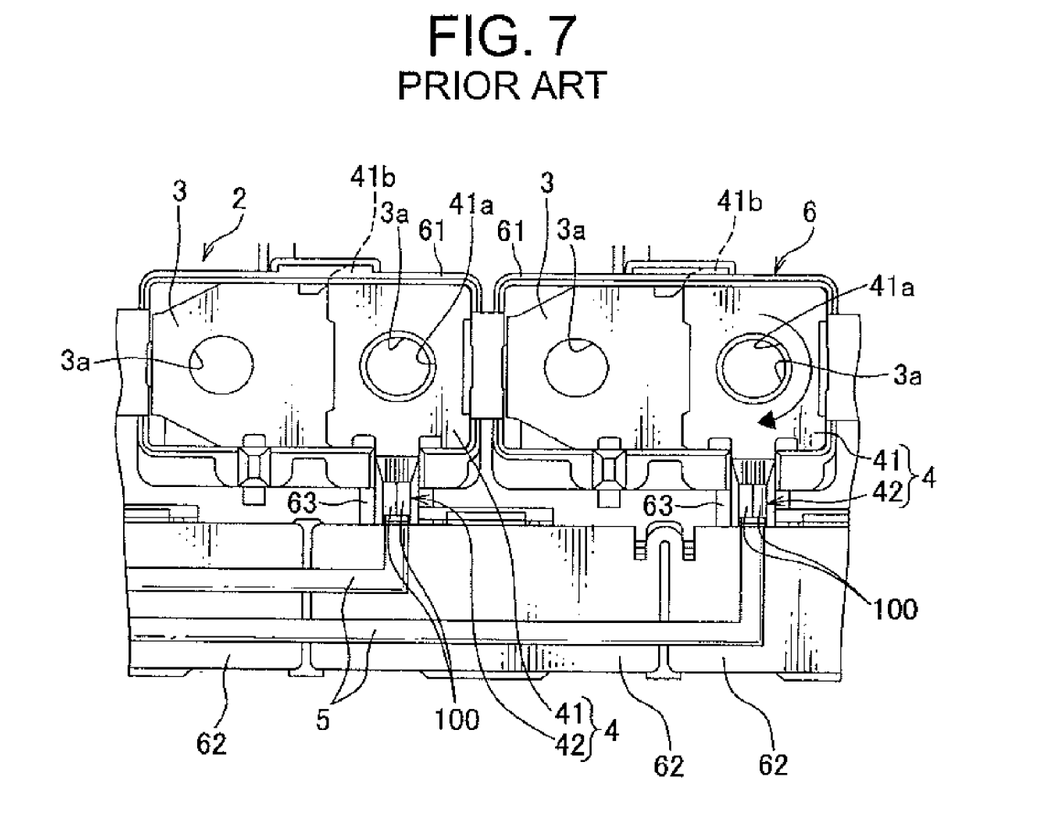
FIG. 7 A top view showing an example of a conventional battery connector.

As shown in FIG. 7, the battery connector 2 includes: a plurality of bus bars 3 for directly connecting the plurality of batteries 10 by connecting the positive electrode 12 and the negative electrode 13 of the batteries 10 adjacent to each other; a terminal 4 connected to each bus bar 3; an electric wire 5 connected to the terminal 4; a not-shown earth wire; and a synthetic-resin-made plate 6 receiving them.

A pair of bus bar holes 3a for respectively inserting the positive electrode 12 and the negative electrode 13 of the batteries 10 adjacent to each other is provided with the bus bar 3. When the positive electrode 12 mounted on one of the batteries 10 adjacent to each other is inserted into one of the pair of bus bar holes 3a, the bus bar 3 is attached to the positive electrode 12. When the negative electrode 13 mounted on the other one of the batteries 10 adjacent to each other is inserted into the other one of the pair of bus bar holes 3a, the bus bar 3 is attached to the negative electrode 13. By attaching in this manner, the bus bar 3 electrically connects the positive electrode 12 and the negative electrode 13 of the batteries 10 adjacent to each other.

The terminal 4 is composed of a bus bar connecting portion 41 and an electric wire connecting portion 42. A terminal hole 41a for inserting any one of the positive electrode 12 and the negative electrode is provided with the bus bar connecting portion 41. The bus bar connecting portion 41 is overlapped with the bus bar 3 while any one of the positive electrode 12 and the negative electrode 13 is inserted into the terminal hole 41a. An area of the bus bar connecting portion 41 is about half of the area of the bus bar 3. The electric wire connecting portion 42 is integrally provided with the bus bar connecting portion 41. The electric wire connecting portion 42 is composed of a pair of crimping pieces 100 with which a core wire of the electric wire 5 is crimped. The electric wire 5 is connected to a not-shown voltage measuring unit for measuring a voltage across each of the batteries 10.

A bus bar receiving portion 61, an electric wire receiving portion 62, an electric wire connecting portion receiving portion 63, and the like are integrally provided with the plate 6. The bus bar receiving portion 61 is formed in a box shape allowed to fit the bus bar 3 thereinto, and receives the bus bar 3 and the bus bar connecting portion 41 overlapped with the bus bar 3. A pair of not-shown plate holes for respectively inserting the positive electrode 12 and the negative electrode 13 is provided on a bottom wall of the bus bar receiving portion 61. The electric wire receiving portion 62 is formed in a gutter shape, and receives the electric wire 5. The electric wire connecting portion receiving portion 63 is formed in a gutter shape for communicating the bus bar receiving portion 61 with the electric wire receiving portion 62, and receives the electric wire connecting portion 42.

The power unit having the above-described structure is assembled as follows. When assembling the power unit, the bus bar 3, the terminal 4, the plate 6, and the like have been separately produced. Further, the electric wire 5 is previously connected to the terminal 4. Incidentally, a connection procedure of the terminal 4 and the electric wire 5 is done as follows. First, the core wire of the electric wire 5 is exposed by removing an insulating cover at an end of the electric wire 5. Then, the core wire is positioned between the pair of crimping pieces 100, and the pair of crimping pieces is crimped to pressure-bond the electric wire 5 to the electric wire connecting portion 42.

Next, the bus bar 3 is received in the bus bar receiving portion 61 of the plate 6 in a manner that the not-shown plate hole is overlapped with the bus bar hole 3a. Next, the bus bar connecting portion 41 is overlapped with the bus bar 3 and received in the bus bar receiving portion 61 in a manner that the terminal hole 41a is overlapped with one of the pair of bus bar holes 3a. At this time, the bus bar connecting portion 41 is overlapped with the bus bar 3 in a manner that the electric wire connecting portion 42 is received in the electric wire connecting portion receiving portion 63. Then, the electric wire 5 is arranged in the electric wire receiving portion 62.

Next, the battery connector 2 assembled according to the above described procedure is attached to the battery assembly 1. Namely, one positive electrode 12 of the batteries 10 adjacent to each other is inserted into one of the pair of not-shown plate holes and one of the pair of bus bar holes 3a overlapped with each other, and one negative electrode 13 of the batteries 10 is inserted into the other one of the pair of not-shown plate holes and the other one of the bus bar holes 3a. Further, the battery connector 2 is arranged on an upper wall of the battery assembly 1 in a manner that any one of the positive electrode 12 and the negative electrode 13 is inserted into the terminal hole 41a. Then, by respectively screwing nuts onto the negative electrode 13 and the positive electrode 12 of the batteries 10, the battery connector 2 is fixed to the batteries 10.

PRIOR ART DOCUMENT

Patent Document

Patent Document 1: JP, A, 2006-269104

DISCLOSURE OF THE INVENTION

Problem to be Solved by the Invention

According to the above-described power unit, because the electric wire connecting portion 42 is composed of a pair of crimping pieces 100 for crimping the electric wire 5, it is necessary to arrange the electric wire 5 in the electric wire receiving portion 62 by hand work, and there is a problem about cost. Further, the terminal 4 is passed through only any one of the positive electrode 12 or the negative electrode 13. Therefore, when the nut is tightened, the terminal 4 may be rotated about the positive electrode 12 or the negative electrode 13 though which the terminal hole 41*a* is passed, and a load may be generated in the electric wire connecting portion 42. For preventing this, the conventional power unit is provided with a rotation stop structure of the terminal 4 composed of a rotation stop projection 41*b* formed on the bus bar 3 of the terminal 4, and a slit formed on a side wall of the bus bar receiving portion 61 for inserting the rotation stop projection 41*b*. Thereby, when the terminal 4 is tried to rotate upon tightening the nut, the rotation stop projection 41*b* abuts on an inner wall of the slit to prevent the rotation. According to the conventional power unit, it is necessary to provide the rotation stop structure described above with the battery connector 2, thereby a structure of the power unit becomes complex, and there is a problem about cost.

Accordingly, an object of the present invention is to provide a power unit and a battery connector configured to reduce costs by automatizing an arrangement of the electric wire.

Means for Solving the Problem

For attaining the object, according to the invention described in claim 1, there is provided a power unit comprising:

a battery assembly having a plurality of batteries arranged side-by-side relationship so as to have positive and negative electrodes alternate in each of the batteries;

a bus bar for connecting in series the plurality of batteries by connecting the positive electrode with the negative electrode in each of the adjacent batteries;

a terminal connected to the bus bar, having an electric wire; and at least a pair of press-connecting blades provided in the terminal for cutting through an insulating cover of the electric wire and press-contacting a core wire of the electric wire so as to permit the electric wire to be press-fitted into between the press-connecting blades.

According to the invention described in claim 2, there is provided the power unit as claimed in claim 1, wherein the bus bar and the terminal are formed integrally with each other.

According to the invention described in claim 3, there is provided the power unit as claimed in claim 2, wherein the terminal includes a coupling portion overlapped with the bus bar for coupling and integrating an end of the bus bar and an end of the terminal with each other.

According to the invention described in claim 4, there is provided the power unit as claimed in claim 3, wherein the bus bar and the terminal are made of a sheet of a metal plate folded 180 degree and overlapped.

According to the invention described in claim 5, there is provided a battery connector comprising:

a bus bar for connecting in series a plurality of batteries arranged side-by-side relationship so as to have positive and negative electrodes alternate in each of the batteries by connecting the positive electrode with the negative electrode in each of the adjacent batteries;

a terminal connected to the bus bar having an electric wire; and at least a pair of press-connecting blades provided in the terminal for cutting through an insulating cover of the electric wire and press-contacting a core wire of the electric wire so as to permit the electric wire to be press-fitted into between the press-connecting blades.

Effect of the Invention

As explained the above, according to the inventions claimed in claims 1 and 5, an arrangement of the electric wire can be automatized by the electric wire connecting portion composed of the pair of press-connecting blades for cutting through an insulating cover of the electric wire and press-contacting a core wire of the electric wire when the electric wire is press-fitted into between the press-connecting blades. Thereby, the power unit can reduce costs.

According to the invention as claimed in claim 2, because the terminal is integrally formed with the bus bar attached to the two electrodes of the positive electrode and the negative electrode, there is no need to provide a rotation stop structure of the terminal when a nut is tightened to the electrode, and thereby, the power unit can reduce costs.

According to the invention as claimed in claim 3, the bus bar and the terminal can be easily integrated with each other by coupling the end of the bus bar and the end of the terminal with the coupling portion.

According to the invention as claimed in claim 4, the bus bar and the terminal can be easily integrated with each other by folding a metal plate.

DESCRIPTION OF EMBODIMENTS

First Embodiment

Figure 2:
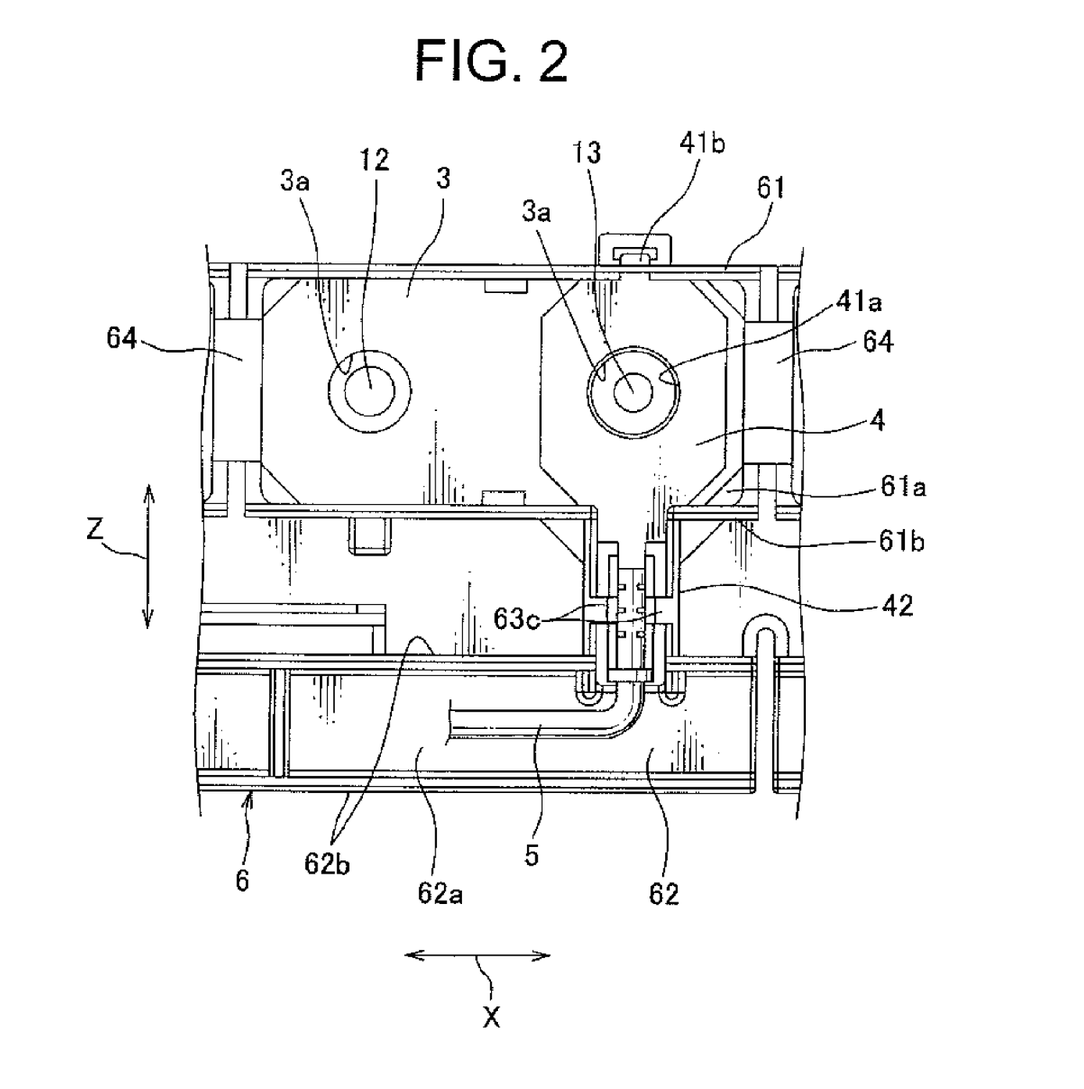
FIG. 2 A partially top view of a battery connector shown in FIG. 1 according to the first embodiment.
Figure 3A:
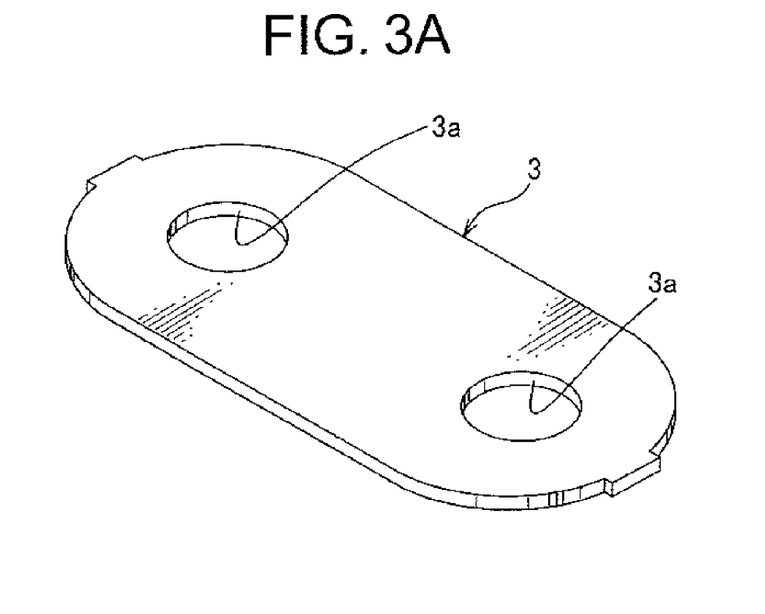
FIG. 3A A perspective view of a bus bar shown in FIG. 2.
Figure 3B:
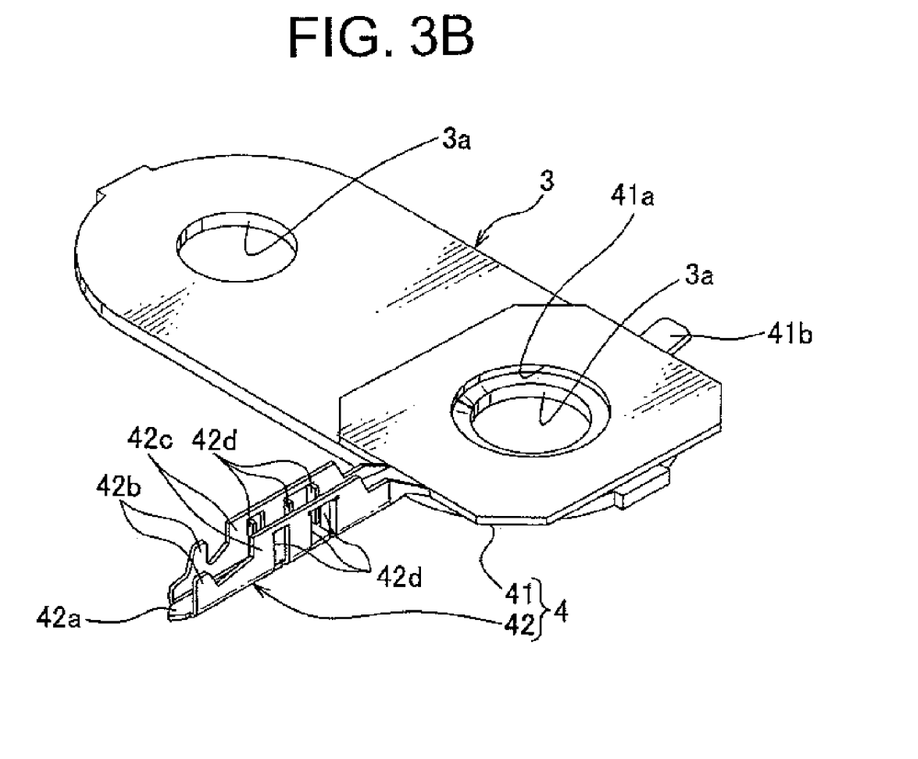
FIG. 3B A perspective view of the bus bar and a terminal shown in FIG. 2.
Figure 4A:
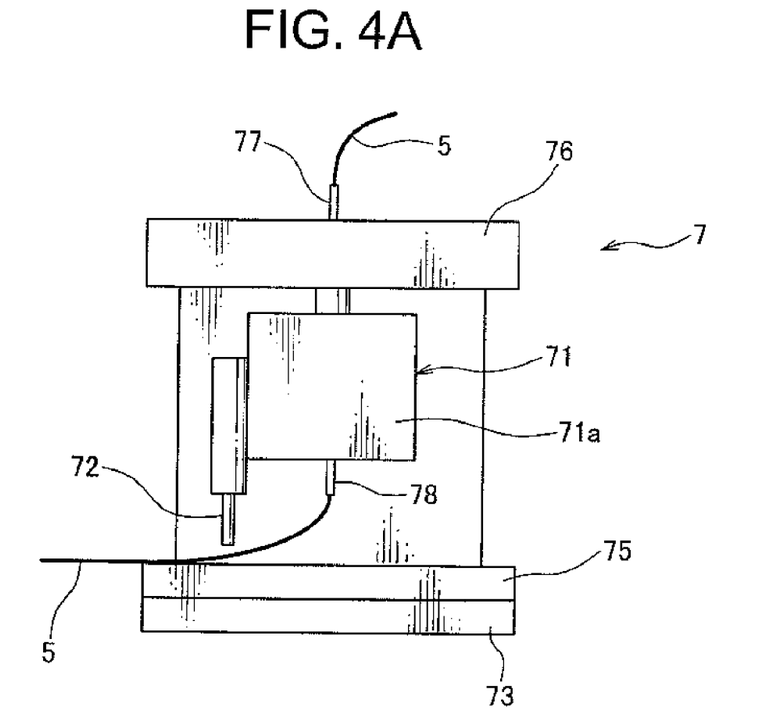
FIG. 4A A side view showing an example of automatic wiring machine.
Figure 4B:
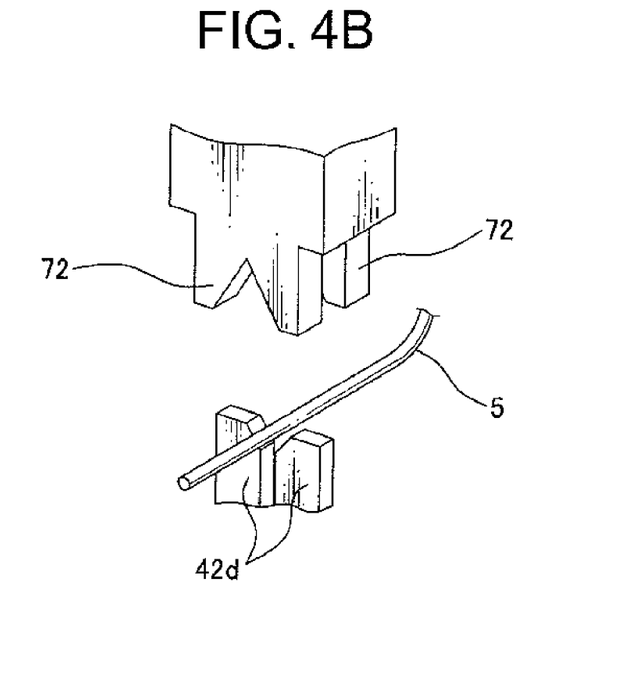
FIG. 4B A partially perspective view of the automatic wiring machine shown in FIG. 4 (A).

Hereinafter, a first embodiment of the present invention will be explained with reference to FIGS. 1 to 4. FIG. 1 is an exploded perspective view showing an embodiment of a power unit according to the present invention. FIG. 2 is a partially top view of a battery connector shown in FIG. 1 according to the first embodiment. FIG. 3A is a perspective view of a bus bar shown in FIG. 2. FIG. 3B is a perspective view of the bus bar and a terminal shown in FIG. 2. FIG. 4A is a side view showing an example of automatic wiring machine. FIG. 4B is an enlarged perspective view of a pressure-connecting crimper shown in FIG. 4A.

A battery connector 2 shown in FIG. 2 is attached to a battery assembly 1 shown in FIG. 1 to compose a power unit. Further, this power unit is mounted on an electric vehicle which runs using an electric motor, or a hybrid vehicle which runs using an engine and an electric motor, and supplies electric power to the electric motor.

As shown in FIG. 1, the battery assembly 1 includes: a plurality of batteries 10; and a fixing member for overlapping and fixing the batteries with each other. Further, each battery 10 includes: a main body of the battery 11 having a box shape; and a positive electrode 12 and a negative electrode 13 respectively projected from one end and the other end of an upper wall of the main body of the battery 11. These positive and negative electrodes 12, 13 are respectively formed in a cylinder shape and made of conductive metal. A thread groove is provided on an outer peripheral wall of each of positive and negative electrodes 12, 13.

Further, the positive and negative electrodes 12, 13 are alternately arranged in an overlapping direction in the plurality of batteries 10. The number of rows of the positive and negative electrodes 12, 13 alternately arranged is two. Further, an arrow X in FIG. 1 indicates an overlapping direction of the plurality of batteries 10 and a longitudinal direction of the battery assembly 1. An arrow Z indicates a width direction of the battery assembly 1. An arrow Y indicates a height direction of the battery assembly 1.

The above-described battery connector 2 is mainly for connecting in series the plurality of batteries 10. As shown in FIG. 2, the battery connector 2 includes: a plurality of bus bars 3 for connecting in series the plurality of batteries 10 by connecting the positive electrode with the negative electrode of the batteries 10 adjacent to each other; a plurality of terminals 4 respectively connected to the bus bars 3 for respectively measuring voltages across the terminals of the batteries 10; electric wires 5 respectively connected to the terminals 4; a not-shown earth wire; and a synthetic-resin-made plate 6 receiving them.

As shown in FIG. 3A, the above-described bus bar 3 is made by pressing a conductive metal plate such as 0.8 mm thick metal plate, and a pair of bus bar holes 3a for inserting the positive and negative electrodes 12, 13 of the batteries 10 adjacent to each other is provided on the plate-shaped metal plate. The bus bar 3 is attached to the positive electrode 12 when the positive electrode 12 provided on one of the batteries adjacent to each other is inserted into one of the pair of bus bar holes 3a. Further, the bus bar 3 is attached to the negative electrode 13 when the negative electrode 13 provided on the other one of the batteries adjacent to each other is inserted into the other one of the pair of bus bar holes 3a. Then, the bus bar 3 is fixed to the batteries 10 when nuts N (FIG. 1) are respectively screwed onto the positive and negative electrodes 12, 13 which are respectively inserted into the bus bar holes 3a.

The above-described terminal 4 is made by pressing a conductive metal plate. A thickness of the metal plate for making the terminal 4 is thinner (for example, 0.4 mm) than the metal plate for making the bus bar 3 because of making a later-described press-connecting blade 42. As shown in FIG. 3B, the terminal 4 is composed of a bus bar connecting portion 41 overlapped with the bus bar 3 and electrically connected to the bus bar 3, and a wire connecting portion 42 connected to the bus bar connecting portion 41 and attached to the electric wire 5. The bus bar connecting portion 41 is provided with a terminal hole 41a for inserting any one of the positive and negative electrodes 12, 13, and a rotation stop projection 41b projected from an end away from the wire connecting portion 42 for stopping a rotation of terminal 4 on the metal plate. An area of the bus bar connecting portion 41 is about half of the area of the bus bar 3. The wire connecting portion 42 is provided with a bottom plate 42a on which the electric wire 5 is positioned, a pair of crimping pieces 42b extended vertically from the bottom plate 42a, a pair of side walls 42c extended vertically from the bottom plate 42a and between which the electric wire 5 is positioned, and three pairs of press-connecting blades 42d projected inward from the pair of side walls 42c.

An insulating cover at an end of the electric wire 5 is crimped with the pair of crimping pieces 42b to fix the electric wire 5 to the wire connecting portion 42. The three pairs of press-connecting blades 42d are respectively formed by cutting partially the pair of side walls 42c in substantially C-shape, and pushing inward. The three pairs of press-connecting blades 42d are arranged in the longitudinal direction of the electric wire 5 with gaps therebetween. The three pairs of press-connecting blades 42d respectively face each other. When the electric wire 5 is press-inserted therebetween, the press-connecting blades 42d cut through the insulating cover of the electric wire 5, and press-connect with the core wire of the electric wire 5. Thus, the press-connecting blades 42d electrically connect the electric wire 5 with the terminal 4, and prevent the electric wire 5 from being displaced in the longitudinal direction of the wire connecting portion 42.

One end of the electric wire 5 is attached to the wire connecting portion 42, and the other end of the electric wire 5 is connected to a later-described voltage measuring unit. Further, the electric wire 5 attached to the wire connecting portion 42 (namely, the terminal 4) is arranged in a wire receiving portion 62 of the plate 6. The electric wire 5 is a so-called covered wire of which conductive core wire is covered by an insulating cover. Further, the electric wire 5 is a round wire of which cross section is round.

The plate 6 is formed in a substantially rectangular shape substantially same as a top wall of the battery assembly 1. As shown in FIG. 1, the plate 6 is overlapped with the top wall of the battery assembly 1. As shown in FIGS. 1 and 2, the plate 6 is provided with a plurality of bus bar receiving portions 61, a plurality of electric wire receiving portions 62, a plurality of electric wire connecting portion receiving portions 63, a plurality of hinges 64.

As shown in FIGS. 1 and 2, the bus bar receiving portion 61 is formed in a box shape into which the bus bar 3 is allowed to be fitted, and receives the bus bar 3 and the bus bar connecting portion 41 overlapped with the bus bar 3. The plurality of bus bar receiving portions 61 are arranged along the overlapping direction of the batteries 10, namely, the arrow X direction. Further, as shown in FIG. 1, two rows of the bus bar receiving portions 61 are arranged with a gap along the width direction of the plate 6, namely, the arrow Z direction. Further, as shown in FIG. 2, each bus bar receiving portion 61 is formed in a box shape having a bottom wall 61a of which surface the bus bar 3 is positioned on, and a peripheral wall 61b extended vertically from an outer edge of the bottom wall 61a. Further, the bottom wall 61a is provided with a not-shown pair of plate holes for inserting respectively the anode and cathode electrodes 12, 13. Further, the peripheral wall 61b is provided with a not-shown slit for inserting the rotation stop projection 41b provided on the bus bar connecting portion 41. The rotation stop projection 41b provided on the bus bar connecting portion 41 and the slit provided on the peripheral wall 61b of the bus bar receiving portion 61 make up a rotation stop structure of the terminal 4 upon fastening a nut similar to the conventional way.

The plurality of electric wire receiving portions 62 is arranged on a straight line parallel to an arranging direction of the bus bar receiving portions 61. Each electric wire receiving portion 62 is formed in a gutter shape able to receive the electric wire 5 connected to each terminal 4. Further, as shown in FIG. 1, two rows of the electric wire receiving portions 62 are arranged with a gap along the width direction of the plate 6, namely, the arrow Z direction. Further, the two rows of the bus bar receiving portions 61 are interposed between the two rows of the electric wire receiving portions 62. Further, as shown in FIG. 2, each electric wire receiving portion 62 is formed in a gutter shape having a bottom wall 62a of which surface the electric wire 5 is positioned on, and side walls 62b extended vertically from both ends of the bottom wall 62a in the arrow Z direction.

Each electric wire connecting portion receiving portion 63 connects the bus bar receiving portion 61 and the electric wire receiving portion 62 facing each other with a gap, and receives the wire connecting portion 42 of the terminal 4. As shown in FIG. 1, each electric wire connecting portion receiving portion 63 is formed in a gutter shape having a bottom wall 63a coupling the bottom wall 61a of the bus bar receiving portion 61 with the bottom wall 62a of the electric wire receiving portion 62 facing each other along the width direction of the plate 6, namely, the arrow Z direction, and a pair of coupling walls 63b extended vertically from outer edges of the bottom plate 63a and coupling the peripheral wall 61b of the bus bar receiving portion 61 with the side walls 62b of the electric wire receiving portion 62 facing each other along the width direction of the plate 6. The wire connecting portion 42 of the terminal 4 is positioned on a surface of the bottom wall 63a. Further, locking claws 63c for locking on upper walls of a pair of side walls 42c formed on the wire connecting portion 42 are provided on upper walls of the coupling walls 63b.

The hinge 64 couples the bus bar receiving portions 61 adjacent to each other, and is formed elastically deformable. Further, the hinge 64 is formed in a C-shaped section. A gap between the bus bar receiving portions 61 adjacent to each other is changed by elastically deforming the hinge 64 in a manner that both ends in the C-shape of the hinge 64 is moved close to each other or away from each other, namely, by elastically deforming the hinge 64 in a manner expanding and contracting the both ends in the C-shape of the hinge 64.

Next, an assembling procedure of the above-described power unit will be explained. Before assembling the power unit, the plate 6, the bus bar 3, the terminal 4, and the like are separately produced. First, the bus bar 3 is moved close to the bottom wall 61a of the bus bar receiving portion 61 in a manner overlapping with the bottom wall 61a, and the bus bar 3 is fitted into the bus bar receiving portion 61 of the plate 6. When the bus bar 3 is fitted into the bus bar receiving portion 61, the not-shown plate hole formed on the bus bar receiving portion 61 and the bus bar hole 3a are overlapped with each other. Alternately, each bus bar 3 may be previously insert-molded into the bus bar receiving portion 61. Next, the rotation stop projection 41b formed on the bus bar connecting portion 41 of the terminal 4 is inserted into the not-shown slit provided on the peripheral wall 61b of the bus bar receiving portion 61, and the bus bar connecting portion 41 of the terminal is overlapped with the bus bar 3 to receive the terminal 4 in the bus bar receiving portion 61. Conventionally, the bus bar connecting portion 41 of the terminal 4 to which the electric wire 5 is already attached is received in the bus bar receiving portion 61. However, according to the present invention, the bus bar connecting portion 41 of the terminal 4 to which the electric wire 5 is not attached is received in the bus bar receiving portion 61. Therefore, the terminal 4 may be previously insert-molded into the bus bar receiving portion 61.

Next, an end of the electric wire 5 is connected to the wire connecting portion 42 of the terminal 4 using, for example, an automatic wiring machine 7 shown in FIG. 4, and the electric wire 5 is arranged in the electric wire receiving portion 62. Hereinafter, the automatic wiring machine 7 shown in FIG. 4A will be explained. As shown in FIG. 4A, the automatic wiring machine 7 includes: a wiring head 71; a press-connecting crimper 72; a fixed frame 73 for supporting these members; and an X-Y table 75 for moving back to forth and left to right a wiring board provided on the fixed frame 73.

A casing 71a of the wiring head 71 is provided movably up and down on an upper plate 76 of the fixed frame 73. A wire service tube 77 is provided on an upper end of the upper plate 76. Further, a wire supply tube 78 is provided on a bottom end of the casing 71a. Further, a pair of press-connecting crimper 72 having an inverted V shape for press-connecting the electric wire 5 is provided movably up and down on a side wall of the casing 71a (see FIG. 4B). Next, a process to connect an end of the electric wire 5 with the wire connecting portion 42 and a process to arrange the electric wire 5 in the electric wire receiving portion 62 using the automatic wiring machine 7 shown in FIG. 4 will be explained.

The plate 6 receiving the bus bar 3 and the terminal 4 is put on top of the wiring board. Next, the X-Y table 75 is moved so that a tip of the wire supply tube 78 is moved along a line on which the electric wire 5 in the electric wire receiving portion 62 is planned to be arranged. In detail, the X-Y table 75 is moved so that the tip of the wire supply tube 78 is moved from an end of the electric wire receiving portion 62 in the arrow X direction to the wire connecting portion 42 of the terminal 4 which is planned to be connected. The electric wire 5 is guided out through the wire supply tube 78 by a not-shown wire feeding machine embedded in the casing 71a in accordance with the movement of the X-Y table 75. Thereby, the electric wire 5 is arranged in the electric wire receiving portion 62.

After the wire supply tube 78 is moved to the wire connecting portion 42 of the terminal 4, as shown in FIG. 4B, the X-Y table 75 is moved so that the electric wire 5 supplied from the wire supply tube 78 is positioned right above the pair of press-connecting blades 42d at the electric wire receiving portion 62 side. Incidentally, in FIG. 4B, a side plate 42c of the wire connecting portion 42 is omitted. Then, a pair of press-connecting crimpers 72 is moved down, and the electric wire 5 is press-inserted into between the pair of press-connecting blades 42d. Thereby, the press-connecting blades 42d cut through the insulating cover of the electric wire 5, and press-connects the core wire of the electric wire 5. Then, the electric wire 5 is press-connected to two remaining pairs of the press-connecting blades 42d with the similar process. The movement of the X-Y table 75 is controlled by such as a microcomputer. Then, after the pair of crimping pieces 42b is crimped to fix the electric wire 5, the battery connector 2 as the plate 6 to which the bus bar 3, the terminal 4, and the electric wire 5 are attached is attached to the battery assembly 1 similar to the conventional way to finish assembling the power unit.

According to the above-described power unit, the wire connecting portion 42 is composed of at least one pair of press-connecting blades 42d for cutting through the insulating cover of the electric wire 5 and press-connecting the core wire of the electric wire 5 when the electric wire 5 is press-inserted between the press-connecting blades 42d. Therefore, the arrangement of the electric wire 5 can be automated using such as the automatic wiring machine 7 shown in FIG. 4, and the power unit can reduce costs.

Second Embodiment

Figure 5:
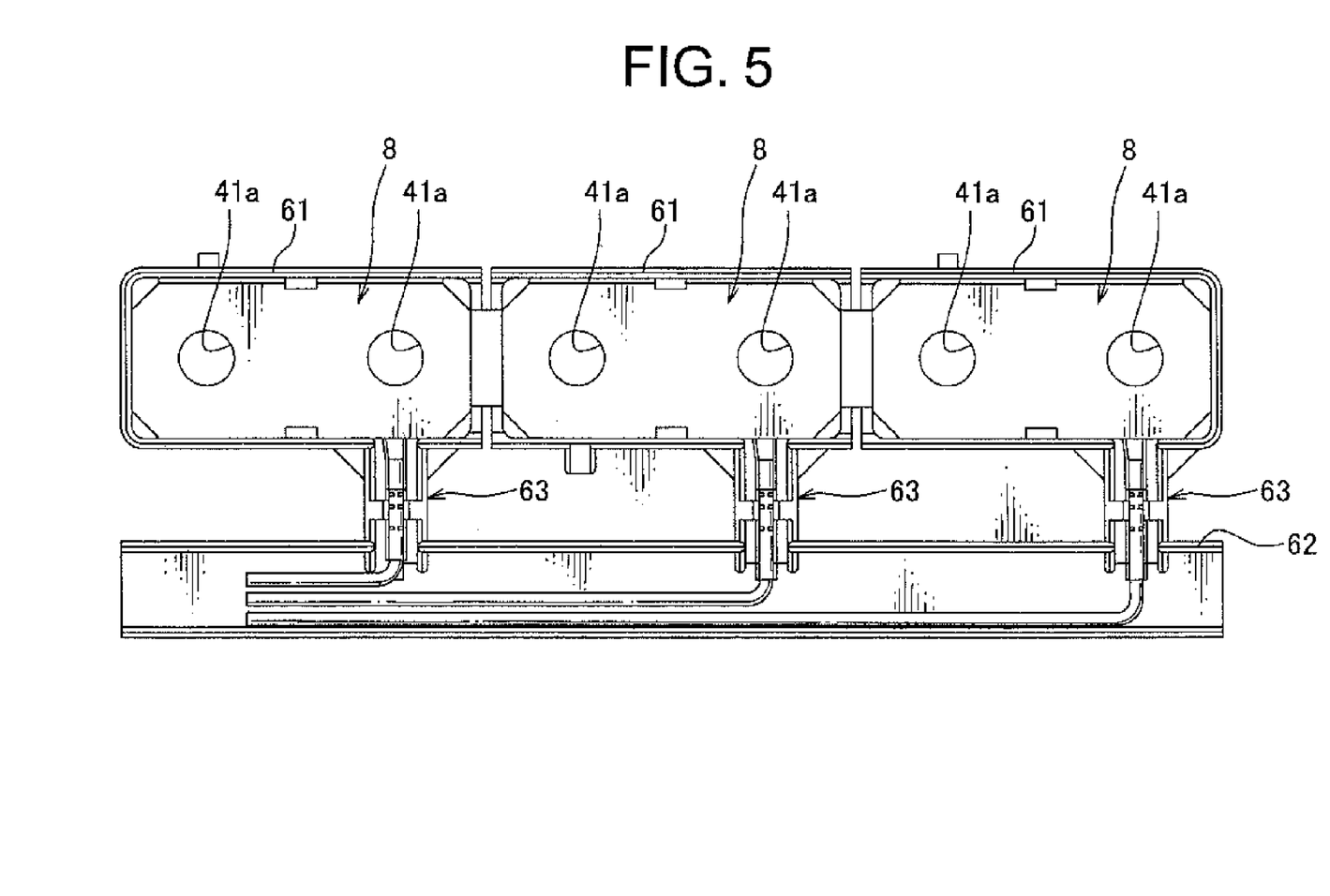
FIG. 5 A top view of the battery connector according to a second embodiment of the present invention.
Figure 6A:
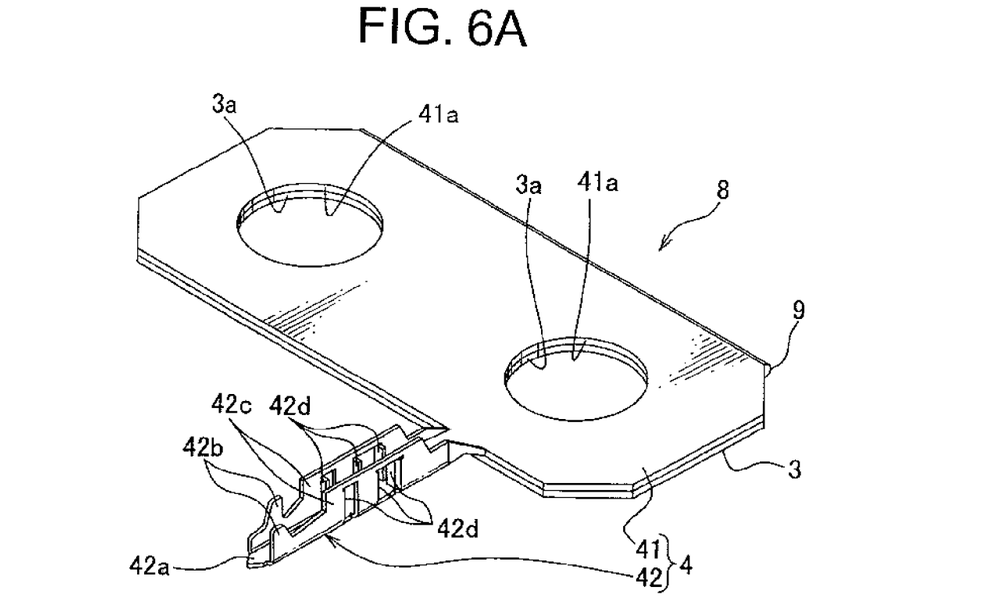
FIG. 6A A perspective view showing a bus-bar-terminal unit shown in FIG. 5.
Figure 6B:
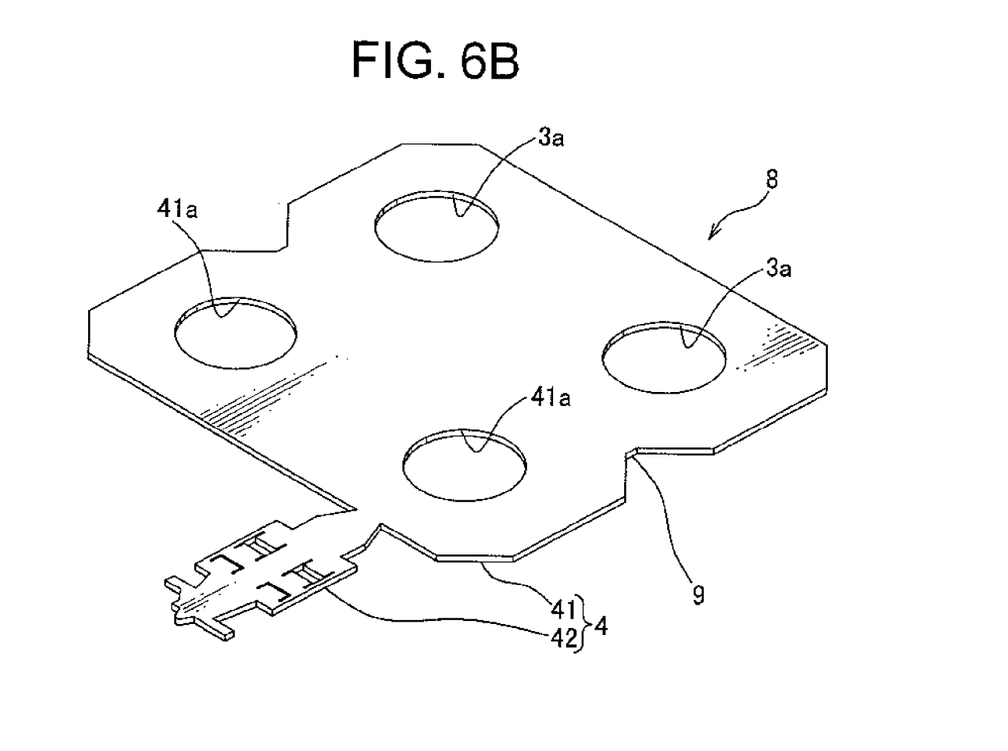
FIG. 6B A perspective view showing the bus-bar-terminal unit shown in FIG. 5 in a condition that the bus-bar-terminal unit is not folded yet.

Next, a second embodiment of the present invention will be explained with reference to FIGS. 5, 6A, and 6B. FIG. 5 is a top view of the battery connector 2 according to the second embodiment of the present invention. FIG. 6A is a perspective view showing a bus-bar-terminal unit shown in FIG. 5. FIG. 6B is a perspective view showing the bus-bar-terminal unit shown in FIG. 5 in a condition that the bus-bar-terminal unit is not folded yet.

In the first embodiment described above, the bus bar 3 and the terminal 4 are provided separately. In the second embodiment, the bus bar 3 and the terminal 4 are integrally provided as the bus-bar-terminal unit 8. As shown in FIG. 6A, in the bus-bar-terminal unit 8, the bus bar 3, the terminal 4, and a coupling portion 9 are formed integrally with each other by pressing one metal plate. Similar to the first embodiment, a pair of bus bar holes 3a for inserting the positive and negative electrodes 12, 13 of the batteries 10 adjacent to each other is provided on the bus bar 3. Similar to the first embodiment, the terminal 4 is composed of the bus bar connecting portion 41 overlapped with the bus bar 3 and electrically connected to the bus bar 3, and the wire connecting portion 42 into which the electric wire 5 connected to the bus bar connecting portion 41 is attached.

Unlike the first embodiment, a size and a shape of the bus bar connecting portion 41 are the same as those of the bus bar 3. A pair of terminal holes 41a for inserting the positive and negative electrodes 12, 13 is provided on the bus bar connecting portion 41. Similar to the first embodiment, the wire connecting portion 42 is provided with a bottom plate 42a on which the electric wire 5 is positioned, a pair of crimping pieces 42b extended vertically from the bottom plate 42a, a pair of side walls 42c extended vertically from the bottom plate 42a and between which the electric wire 5 is positioned, and three pairs of press-connecting blades 42d projected inward from the pair of side walls 42c. Because the bottom plate 42a, the pair of crimping pieces 42b, the pair of side walls 42c, and the press-connecting blades 42d are already explained in the first embodiment, a detailed explanation of those is omitted here. The coupling portion 9 couples the bus bar 3 and the terminal 4 together. The coupling portion 9 couples an end of the pair of bus bar holes 3a with an end of the pair of terminal holes 41a along the arranging direction (namely, arrow X direction).

Next, a production process of the bus-bar-terminal unit 8 will be explained. First, a sheet of metal is punched as shown in FIG. 6B. A thickness of the metal plate forming the bus-bar-terminal unit 8 is about half of 1 mm thick (0.4 mm) used in the conventional bus bar 3 for forming the press-connecting blades 42d. The metal plate shown in FIG. 6B is folded 180 degree along the coupling portion 9, and the bus bar 3 and the bus bar connecting portion 41 are overlapped with each other. A combined thickness of the bus bar 3 and the bus bar connecting portion 41 is substantially the same as the conventional bus bar 3, and the strength thereof is maintained. Then, the wire connecting portion 42 is formed by pressing process.

Next, an assembling procedure of the above-described power unit will be explained. Before assembling the power unit, the plate 6, and the bus-bar-terminal unit 8 are separately produced. First, the bus bar 3 of the bus-bar-terminal unit 8 is moved close to the bottom wall 61a of the bus bar receiving portion 61 in a manner overlapping with the bottom wall 61a, and the bus-bar-terminal unit 8 is fitted into the bus bar receiving portion 61 of the plate 6. When the bus-bar-terminal unit 8 is fitted into the bus bar receiving portion 61, the not-shown plate hole, the bus bar hole 3a, and the terminal hole 41a are overlapped with each other. Alternately, each bus-bar-terminal unit 8 may be previously insert-molded into the bus bar receiving portion 61. Incidentally, when the bus-bar-terminal unit 8 is fitted into the bus bar receiving portion 61, similar to the first embodiment, the electric wire 5 is not attached to the terminal 4.

Next, similar to the first embodiment, an end of the electric wire 5 is connected to the wire connecting portion 42 of the terminal 4 using, for example, an automatic wiring machine 7 shown in FIG. 4, and the electric wire 5 is arranged in the electric wire receiving portion 62. Then, after the pair of crimping pieces 42b is crimped to fix the electric wire 5, the battery connector 2 as the plate 6 to which the bus bar 3, the terminal 4, and the electric wire 5 are attached is attached to the battery assembly 1 similar to the conventional way to finish assembling the power unit.

According to the above-described power unit, similar to the first embodiment, the wire connecting portion 42 is composed of at least one pair of press-connecting blades 42d for cutting through the insulating cover of the electric wire 5 and press-connecting the core wire of the electric wire 5 when the electric wire 5 is press-inserted between the press-connecting blades 42d. Therefore, the arrangement of the electric wire 5 can be automated using such as the automatic wiring machine 7 shown in FIG. 4, and the power unit can reduce costs.

Further, according to the above-described power unit, the bus bar connecting portion 41 is integrally formed with the bus bar 3 attached to two electrodes of the positive and negative electrodes 12, 13. Therefore, unlike the first embodiment, the rotation stop structure of the terminal 4 for fastening the nut is unnecessary, and the power unit can reduce costs.

Further, according to the above-described power unit, the bus bar 3 and the terminal 4 can be easily integrated by only coupling the ends of the bus bar 3 and the terminal 4 with the coupling portion 9.

Further, according to the above-described power unit, the bus bar 3 is composed of one of a metal plate folded 180 degree and overlapped, and the terminal 4 is composed of the other of the metal plate folded 180 degree and overlapped. Therefore, the bus bar 3 and the terminal 4 are easily integrated only by folding one metal plate.

Incidentally, according to the above-described embodiment, the bus bar 3 is composed of one of a metal plate folded 180 degree and overlapped, and the terminal 4 is composed of the other of the metal plate folded 180 degree and overlapped. However, the present invention is not limited to this. For example, the wire connecting portion 42 is provided at an end of one metal plate, and this metal plate may be used as both the bus bar 3 and the bus bar connecting portion 41.

Further, according to the first and second embodiments, the wire connecting portion 42 is integrally provided with the bus bar connecting portion 41. However, the present invention is not limited to this. For example, the bus bar connecting portion 41 and the wire connecting portion 42 may be separated from each other.

Further, according to the second embodiment, the coupling portion 9 is provided along the arranging direction of the bus bar 3, the pair of bus bar holes 3a of the bus bar connecting portion 41, and the terminal holes 41a (namely, arrow X direction). However, the present invention is not limited to this. For example, the coupling portion 9 may be provided along a direction perpendicular to the arranging direction of the bus bar 3 and the bus bar connecting portion 41 (namely, arrow Z direction).

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

EXPLANATION OF REFERENCE 1 battery assembly
3 bus bar
4 terminal
5 electric wire
9 coupling portion
10 battery
12 positive electrode
13 negative electrode
42d press-connecting blade

The invention claimed is:

1. A power unit comprising:
a battery assembly having a plurality of batteries arranged side-by-side relationship so as to have positive and negative electrodes alternate in each of the batteries;
a bus bar for connecting in series the plurality of batteries by connecting the positive electrode with the negative electrode in each of the adjacent batteries;
a terminal connected to the bus bar, having an electric wire; and
at least a pair of press-connecting blades provided in the terminal for cutting through an insulating cover of the electric wire as the wire is inserted between the blades and press-contacting a core wire of the electric wire so as to permit the electric wire to be press-fitted into between the press-connecting blades.

2. The power unit as claimed in claim 1,
wherein the bus bar and the terminal are formed integrally with each other.

3. The power unit as claimed in claim 2,
wherein the terminal includes a coupling portion overlapped with the bus bar for coupling and integrating an end of the bus bar and an end of the terminal with each other.

4. The power unit as claimed in claim 3,
wherein the bus bar and the terminal are made of a sheet of a metal plate folded 180 degree and overlapped.

5. A battery connector comprising:
a bus bar for connecting in series a plurality of batteries arranged side-by-side relationship so as to have positive and negative electrodes alternate in each of the batteries by connecting the positive electrode with the negative electrode in each of the adjacent batteries;
a terminal connected to the bus bar having an electric wire; and
at least a pair of press-connecting blades provided in the terminal for cutting through an insulating cover of the electric wire as the wire is inserted between the blades and press-contacting a core wire of the electric wire so as to permit the electric wire to be press-fitted into between the press-connecting blades.

* * * * *